US008789170B2

(12) United States Patent
Sastry et al.

(10) Patent No.: US 8,789,170 B2
(45) Date of Patent: Jul. 22, 2014

(54) METHOD FOR ENFORCING RESOURCE ACCESS CONTROL IN COMPUTER SYSTEMS

(75) Inventors: Manoj R. Sastry, Portland, OR (US); Ioannis T. Schoinas, Portland, OR (US); Daniel M. Cermak, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 319 days.

(21) Appl. No.: 12/890,040

(22) Filed: Sep. 24, 2010

(65) Prior Publication Data

US 2012/0079590 A1  Mar. 29, 2012

(51) Int. Cl.
*G06F 12/14* (2006.01)

(52) U.S. Cl.
USPC ..................... 726/21; 726/1; 726/2

(58) Field of Classification Search
None
See application file for complete search history.

(56) References Cited

U.S. PATENT DOCUMENTS

| | | | |
|---|---|---|---|
| 7,774,723 B2* | 8/2010 | Banerjee | 716/119 |
| 7,793,345 B2* | 9/2010 | Weber et al. | 726/21 |
| 8,036,243 B2* | 10/2011 | Georgiou et al. | 370/467 |
| 2003/0172214 A1 | 9/2003 | Moyer et al. | |
| 2004/0088566 A1 | 5/2004 | Chou et al. | |
| 2005/0278551 A1 | 12/2005 | Goodnow et al. | |
| 2006/0129747 A1 | 6/2006 | Weber et al. | |
| 2008/0052532 A1 | 2/2008 | Akkar et al. | |
| 2008/0222589 A1* | 9/2008 | Banerjee | 716/11 |
| 2009/0049220 A1 | 2/2009 | Conti et al. | |
| 2010/0153658 A1 | 6/2010 | Duncan et al. | |

FOREIGN PATENT DOCUMENTS

| | | |
|---|---|---|
| JP | 2006-505867 A | 2/2006 |
| JP | 2007-524161 A | 8/2007 |
| JP | 2007-287141 A | 11/2007 |
| JP | 2008-510338 A | 4/2008 |
| JP | 2009-508192 A | 2/2009 |
| JP | 2010-140480 A | 6/2010 |
| WO | 2005/116804 A2 | 12/2005 |
| WO | 2006/018753 A1 | 2/2006 |
| WO | 2007/024740 A2 | 3/2007 |
| WO | 2012/040691 A1 | 3/2012 |

OTHER PUBLICATIONS

International Search Report and Written Opinion received for PCT Application No. PCT/US2011/053216, mailed on Feb. 28, 2012, 8 pages.
International Preliminary Report on Patentability Received for PCT Patent Application No. PCT/US2011/053216 , mailed on Apr. 4, 2013, 6 pages.
Office Action received for Japanese Patent Application No. 2013-529450, mailed on Feb. 4, 2014, 4 pages of Office Action including 2 pages of English Translation.

* cited by examiner

*Primary Examiner* — Kaveh Abrishamkar

(57) ABSTRACT

A method and system for enforcing access control to system resources and assets. Security attributes associated with devices that initiate transactions in the system are automatically generated and forwarded with transaction messages. The security attributes convey access privileges assigned to each initiator. One or more security enforcement mechanisms are implemented in the system to evaluate the security attributes against access policy requirements to access various system assets and resources, such as memory, registers, address ranges, etc. If the privileges identified by the security attributes indicate the access request is permitted, the transaction is allowed to proceed. The security attributes of the initiator scheme provides a modular, consistent secure access enforcement scheme across system designs.

20 Claims, 4 Drawing Sheets

METHOD FOR ENFORCING RESOURCE ACCESS CONTROL IN COMPUTER SYSTEMS

FIELD OF THE INVENTION

The field of invention relates generally to computer systems and, more specifically but not exclusively relates to method for enforcing resource access control in computer systems including systems on a chip.

BACKGROUND INFORMATION

Security issues relating to computer systems have become an ever increasing problem. Viruses, Trojans, malware, and the like are common threats that are well-known to most computer users. The level of threat is so pervasive that an entire industry has been created to address these problems via use of security-related software and services, such as antivirus, antispyware, firewall software, etc.

Most security attacks are targeted at the software level, and are designed to access various operating system or file resources. For examples, a virus may gain access to a computer system's files via download of an executable program containing the virus' code in a hidden manner. To prevent this type of attack, antivirus software may be used to "scan" downloaded files looking for known or suspicious code. As a result of security threats, many users employ security software.

Although less common, security attacks can also be made at the hardware level. However, there is no equivalent to security software to prevent access to system-level hardware resources and assets, such as configuration registers, range registers, and the like. As a result, system architects design in various hardware- and firmware-based security measures for controlling access to important system resources. This is typically done on a per-system basis, leading to replication of design, debug, and validation work and inconsistent management of security across system designs.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Embodiments of methods and apparatus for enforcing resource access control are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
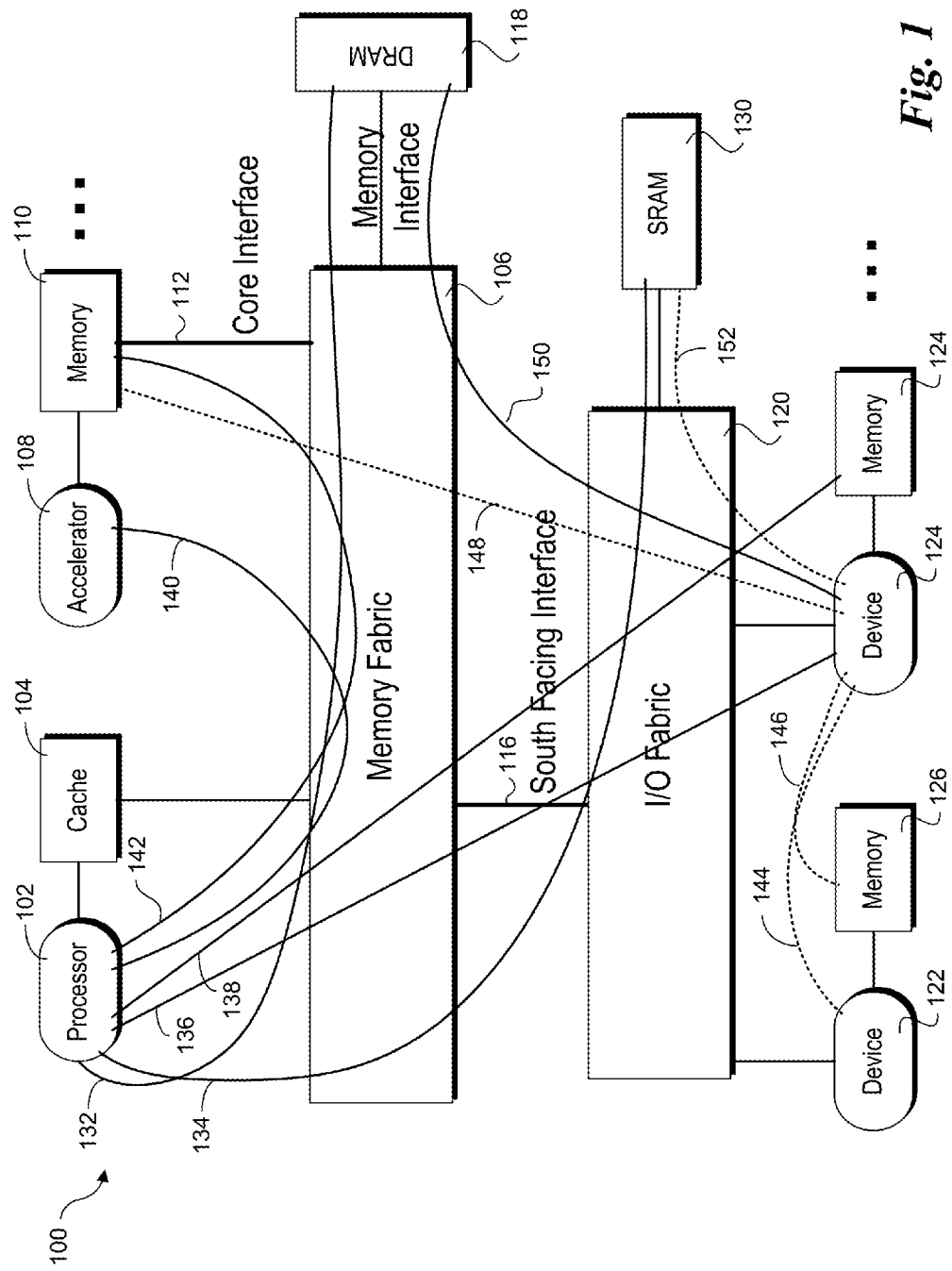
FIG. 1 is a system schematic diagram illustrating an exemplary System on a Chip architecture and corresponding communication paths associated with transactions initiated by devices in the system.

An architecture corresponding to an exemplary system on a chip (SoC) 100 is shown in FIG. 1. SoC 100 includes one or more processor cores 102, each including a local cache 104 coupled to a memory fabric 106. SoC 100 also includes one or more accelerators 108 coupled to memory 110, which in turn is coupled to memory fabric 106 via core interface 112. Memory fabric 106 also includes a memory interface 114 and a south-facing interface 116. Memory interface 114 facilitates communication with dynamic random access memory (DRAM) 118. South-facing interface 116 provides an interconnect between memory fabric and an IO fabric 120. IO fabric 120 support input/output (I/O) communications with various IO devices, illustrated by devices 122 and 124, each coupled to respective memory 126 and 128. IO fabric 120 also provides an interface between Static Random Access Memory (SRAM) 130 and the rest of the system components.

During operation of SoC 100, various system components may access SoC assets held or provided by other components/devices. For example, processor 102 may access each of DRAM 118, accelerator 108, memory 110, device 124, memory 128, and SRM 130, as depicted by respective communication paths device 132, 134, 136, 138, 140, and 142. Similarly, various IO devices may access other assets, such as devices and memory resources, as depicted by communication paths 144, 146, 148, 150, and 152.

The processor cores, accelerators, and devices interact with each other to process workloads handled by SoC 100. Interaction is facilitated, in part, by accessing memory and storage resources and/or registers associated with the cores, accelerators and devices, as well as common memory resources such as DRAM 118, SRAM 130, etc. Components that initiate such system resource access requests are referred to herein as "initiators."

As can be seen in the architecture of FIG. 1, some of the initiators, such as processor core 102 and accelerator 108 comprise internal components that are built into SoC 100, while other initiators, such as IO devices 122 and 124, may be internal or external to the SoC, depending on their particular function. Also external to the Soc are software and firmware entities that may attempt to access internal or external resources through internal or external initiators in the SoC. As a result, workloads of varying degrees of trustworthiness may be executing at the same time.

The SoC 100 includes data and hardware assets, such as configuration registers, range registers, etc., that must be protected against unauthorized access. Currently, controlling access to these data and hardware assets is handled in an ad-hoc and fragmentary manner for each SoC by the particular architect of the SoC. Previously, there has been no comprehensive support in the SoC fabrics and interfaces to unambiguously determine the privileges of an initiator.

Recent advances in SoC architectures have introduces memory and IO fabrics that support coherency across both internal (e.g., via memory fabric 106) and external (e.g., via IO fabric 120) memory resources. This is facilitated, in part, through a memory access and coherency framework. In some embodiments, this framework is utilized to define a uniform access control architecture that may be implemented across SoC architectures to support secure access to resources in a consistent manner. In one embodiment, memory fabric 106 and IO fabrics 120 employ Intel® QuickPath Interconnect (QPI) frameworks. In general, each of memory fabric and IO fabric comprise interconnects with corresponding control logic for facilitating transactions between devices and resources connected to the interconnects.

In one embodiment, security attributes are assigned to subjects/initiators and used to determine the access rights (i.e., read, write, no access, etc.) of the initiators. These Security Attributes of the Initiator or SAI represent immutable properties of the initiator used for making access decisions. In one embodiment these security attributes are generated by SoC hardware and must accompany every transaction. In one embodiment read and write access policy registers are employed for implementing policies. Additionally, in one embodiment a control policy register is employed that determines what entity or entities can configure the read and write policy registers.

Figure 2:
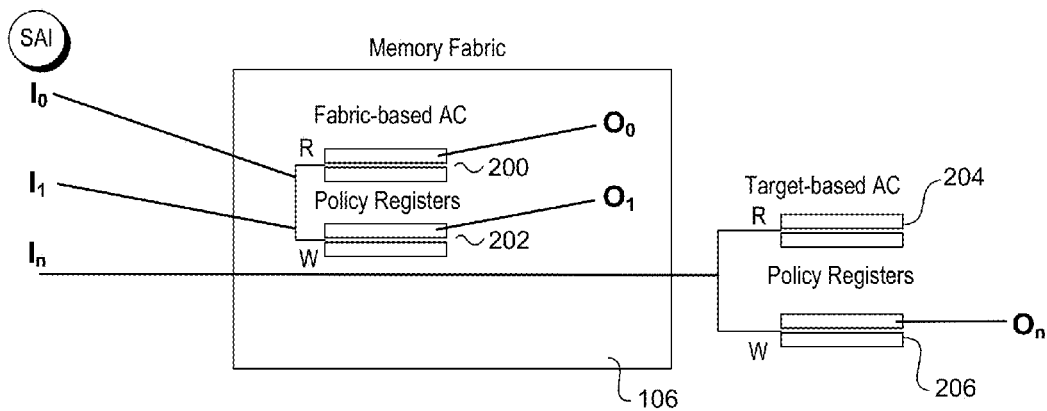
FIG. 2 shows an overview of a secure access mechanism employing policy registers in accordance with one embodiment of the invention.

FIG. 2 shows an overview of an exemplary implementation of an SAI-based security scheme. Under this example, initiators $I_0, I_1, \ldots I_n$, are shown accessing objects $O_0, O_1, \ldots O_n$. Access control for accessing objects that are coupled to a memory fabric 106 (i.e. fabric-based access) is facilitated via memory fabric read and write policy registers 200 and 202. Similarly, access control for accessing external targets (i.e., target-based access), such as IO devices, is facilitated via read and write policy registers 204 and 206.

In the example of FIG. 2, subject $S_0$ desires to perform a read access to an object $O_0$ (not shown) coupled to memory fabric 106. Each of the initiators $I_0, I_1, \ldots I_n$, is assigned a set of security attributes SA, which define the access rights of each initiator as enforced by the SAI security scheme via associated policy registers. Information effecting the set of security attributes SA applicable to a subject is forwarded with each access message initiated by the subject, as described below in further detail. The policy registers store security attributes data for securely controlling access to corresponding objects. If the security attributes of an initiator subject matches the security attributes to access an object, the transaction is allowed to proceed. Conversely, if an initiator subject does not have the proper security attributes (as identified via its SAI information forwarded with its access messages), the transaction will be denied, with a corresponding message being returned to the initiator subject.

Access Control Architecture

As discussed above, term Security Attributes of Initiator (SAI) is defined to represent the immutable properties of a subject or initiator used for making access decisions. In one embodiment, these attributes are generated by hardware entities and accompany each transaction initiated by a corresponding subject or initiator. Unlike source IDs, SAI do not get transformed at bridges; they persist until the point of policy enforcement. Policy registers are employed for defining the policies for read and write access to an asset and for restricting the entity that can configure or update these policies. In one embodiment, the access control architecture is comprised of the following building blocks: SAI, SAI Generator, SAI Mapper, Read Policy Registers, Write Policy Registers and Control Policy Registers. Additionally, in one embodiment wrappers are used to enforce SAI for external ports to ensure that their accesses are appropriately characterized.

SAI

Security Attributes of Initiator or SAI represents the immutable properties of the initiators (and subjects) which are inspected to determine access to targets in a SoC platform. In one embodiment, these properties include a role, device mode and system mode. An initiator may have any combination of these properties. A role is assigned to a group of subjects/initiators with similar privileges. Roles are static and are assigned by the SoC architect. In one embodiment, the mapping of roles to subjects/initiators can be any of the following:

$R[0 \ldots n] \rightarrow S[0 \ldots n]$: Each subject/initiator may have its unique own role.

$R[0] \rightarrow S[0 \ldots n]$: Multiple subjects/initiators may be grouped under the same role.

$R[0 \ldots n] \rightarrow S[0]$: Multiple roles may be assigned to the same subject/initiator.

The Device mode is dynamic and captures the current internal mode of a device. For example, the mode could be a secure or normal mode. The System mode is dynamic and indicates the mode driven by a processor core. In one embodiment, the processor cores are IA cores, based on Intel 32- or 64-bit architecture (known in the industry as IA). For example, the system mode may be in SMM (System Management Mode) or secure mode, etc. Additionally, for multi-threaded initiators, a context attribute for indicating current thread is defined; these attributes would accompany the SAI.

SAI Generator

SAI is an encoding that is generated by SoC hardware and is generated by a function whose input parameters include Role, Device and System Mode. The interpretation of an SAI is specific to each SoC, and defined by the SoC architect. As an example implementation, under an example 7-bit SAI encoding, bit 6 set to 1 could indicate an access by a processor core. If bit 6 is set to 0, then bits 5-0 could be used for encoding device accesses. For example, 1000001b represents IA core access and 0010000b represents a device access. Of course, this is merely exemplary, as the number of bits and format of the SAI encoding may be configured by the architect.

SAI Mapper

The I/O devices in some SoCs are connected to non-vendor (i.e., not the vendor of the SoC) or legacy vendor fabrics. For example, some SoCs may incorporate OCP (Open Core Protocol), AMBA (Advanced Microcontroller Bus Architecture), IOSF (Intel On-Chip System Fabric) or other proprietary bus protocols. SAI Mappers are responsible for mapping the security attributes or SAIs that accompany transactions generated by agents in an SoC vendor's standard fabrics to security attributes that can be interpreted in the SoC-specific device domain (e.g., OCP domain). Similarly, for upstream transactions generated by devices in non-vendor fabrics, the security attributes generated by the devices have to be mapped to SAIs that can be interpreted in the memory/coherency and IOSF domains. Typically these mappers may be implemented in the bridges that map one fabric protocol to another. In some embodiment, these mappers are securely mapped in hardware and cannot be manipulated.

Figure 5:
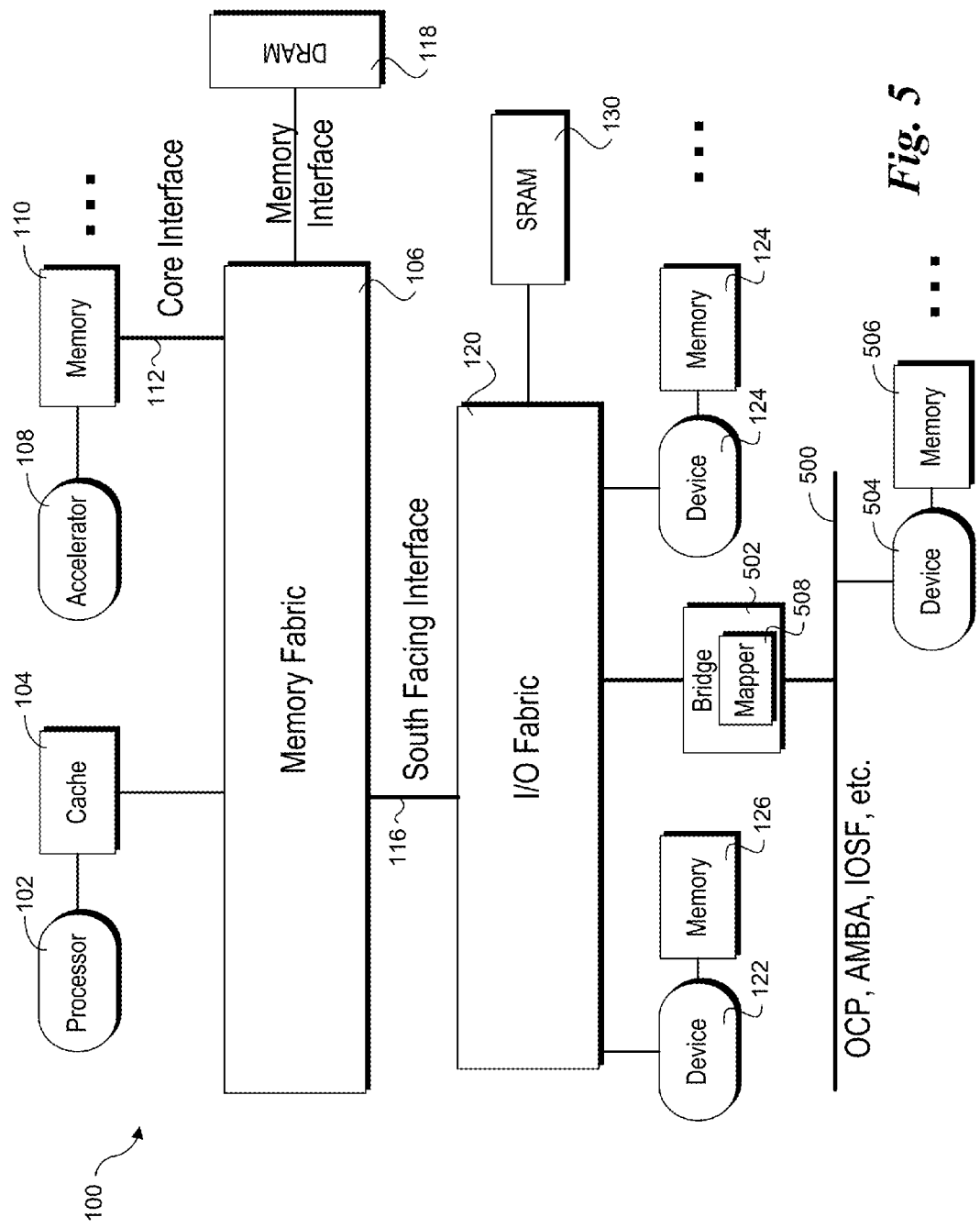
FIG. 5 shows the SoC of FIG. 1, further including a bus implementing a proprietary protocol and a mapper for mapping security attributes between the proprietary protocol and a protocol employed by the SoC fabrics.

An exemplary implementation of an SAI mapper is shown in FIG. 5. In this example, a non-vendor or legacy vendor bus, such as an OCP, AMBA, IOSF, etc. bus 500 is coupled to IO fabric 120 via a bridge 502. One or more devices 504 with memory 506 is coupled to bus 500, wherein access to these devices is in accordance with the protocol implemented by bus 502. Meanwhile, a different protocol is implemented for transactions to access assets and resources connected to memory fabric 106 and IO fabric 120 in SoC 100. To facilitate transactions between devices connected to bus 500 and SoC 100, bridge 502 employs an SAI mapper 508 to map SAI data between the two protocols.

Read and Write Policy Registers

Figure 3:
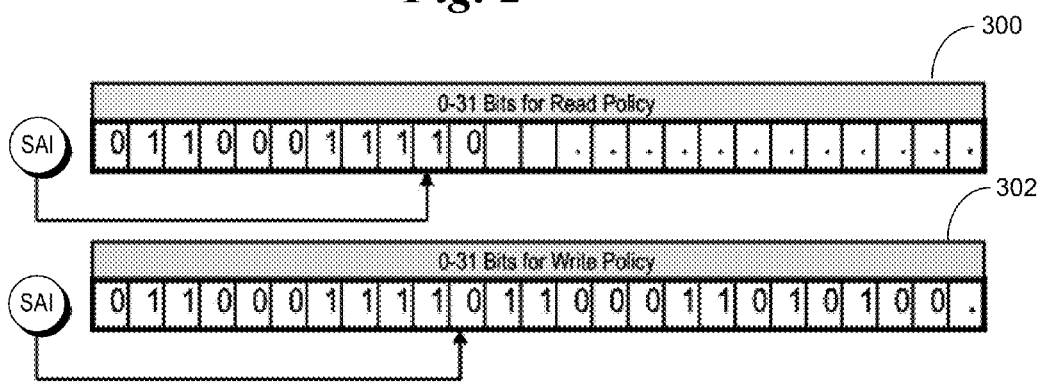
FIG. 3 shows an exemplary set of read and write policy registers in accordance with one embodiment of the invention.

The Read and Write Policy registers contain the read and write permissions that are defined for each initiator by the SoC architect. The SAI accompanying the transaction serves as an index to the policy register. As an example, in one embodiment a 32-bit read and write policy register is defined in the memory fabric. A corresponding pair of read and write policy registers 300 and 302 are shown in FIG. 3, wherein 1's indicate access is allowed and 0's indicate access is denied. In general, the SAI width is n-bits. The value of n may change from one generation to another and/or differ between products. In one embodiment the encoding space is $2^{(n-1)}$, where one of the n bits is used to differentiate core vs. device encodings. Use of a 32-bit register is merely exemplary, as the actual encodings will generally be specific to a product. SAI assignment to an initiator is flexible and depends on the particular product. For example, there could be one SAI per initiator or multiple SAIs per initiator or group multiple initiators into one SAI.

The foregoing example employing a bit vector using a 32-bit register is merely one technique for effecting read and write permissions. Other techniques may also be readily employed, including schemes employing longer or shorter bit vectors, schemes including a hierarchy of permission rules implemented using one or more registers or analogous storage mechanisms, and various other permission logic that may be implemented via hardware, microcode, firmware, etc.

Control Policy Register

Figure 4:
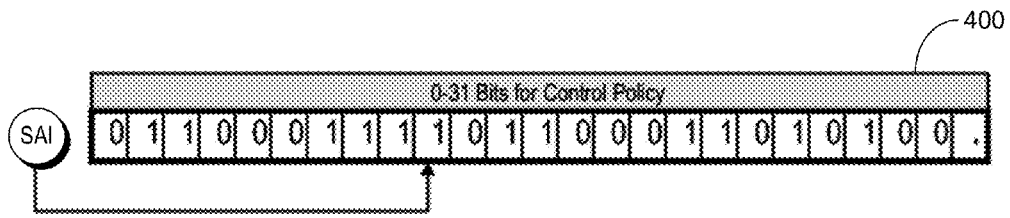
FIG. 4 shows an exemplary control policy register in accordance with one embodiment of the invention.

The contents of the Control Policy Register define the trusted entity that is allowed to configure the Read and Write Policy Registers. The Control Policy Register is a self-referential register; the SAI specified in the Control Policy Register is allowed to modify the read and write register policies as well as overwrite the contents of the Control Policy Register. By allowing a single trusted entity to configure the control policy register, the implication is that access to the policy registers is locked to all other agents. The entity specified by the SAI in the Control Policy Register may choose to extend the set of agents that can configure the Policy Registers beyond the initial value loaded at power-on/reset or the trusted entity may write 0s into the control policy register thus locking it until the next system reset/power-on. This provides flexibility for the SoC architect to implement locking down the policy registers until the next reset or allow the policy to be updated by a trusted entity during runtime. An exemplary 32-bit Control Policy Register 400 is shown in FIG. 4.

Figure 6:
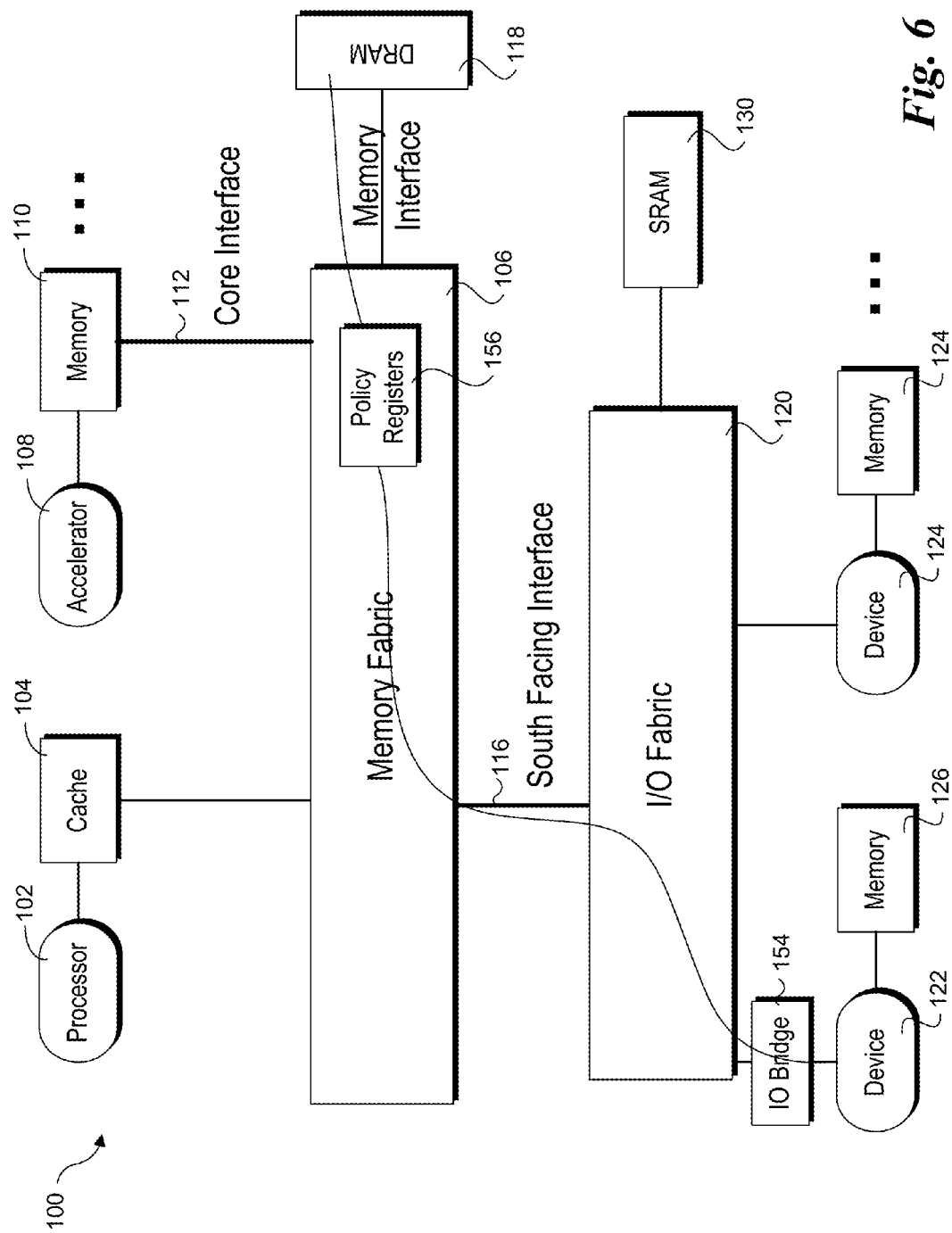
FIG. 6 shows an exemplary transaction and associated secure access enforcement mechanism facilities using the SoC of FIG. 1, according to one embodiment of the invention.

FIG. 6 depicts an example of securely enforcing device accesses to memory. Under this example, device 122 initiates a transaction (e.g., read or write) to access DRAM 118. At an I/O bridge 152, appropriate SAIs are generated via the bridge hardware; these SAI will be forwarded with the transaction message across interfaces until reaching an applicable security enforcement entity, which in this case are policy registers 156 in memory fabric 106. At policy registers 156, the SAI will be inspected and evaluated against the applicable policy register in accordance with the type of transaction, e.g., read or write.

The SAI secure access enforcement scheme disclosed herein provides many advantages over current approaches. It defines uniform access control building blocks such as SAI generators, SAI mappers, policy registers, etc. that can be employed consistently across SoC designs. It applies to SoC fabrics in a uniform manner. These benefits are achieved by associating a persistent attribute, the SAI, with each transaction. By forwarding SAI data within existing formats of transaction messages, support for adding access security measures can be achieved within existing interconnect frameworks, such as QPI. An SoC can use the SAI information to enforce access control on transactions generated by all initiators that target SoC assets such as memory, uncore registers, I/O devices, etc. SAIs can be used to allow exclusive access to memory regions to specific I/O devices or exclusive access to SoC assets when the processor runs in specific modes. The access control architecture is a powerful new paradigm that allows evaluation of all access control decisions within a consistent and modular framework. By carrying the SAI information persistently across interconnects, we simplify design, debug and validation of access control assertions since the initiator security role is immediately available across all micro-architectural structures that buffer transactions.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method comprising:
   in a computer system having one or more processing cores, a first interconnect comprising a memory interconnect via which processing core and memory resources are accessed, and a second interconnect comprising an Input/Output (IO) interconnect coupled to the memory interconnect providing an IO interface to one or more IO devices,
   enforcing a secure access mechanism under which a transaction initiated by an initiator device to access a target resource includes a set of immutable security attributes defining access privileges associated with the initiator device that are evaluated against an access policy defined for the target resource; and
   allowing the transaction to proceed if the set of immutable security attributes indicate access to the target resource by the initiator device is permitted by the access policy, wherein all security attributes in the set of immutable security attributes are immutable.

2. The method of claim 1, further comprising employing system hardware to generate sets of immutable security attributes in response to initiation of transactions in the system.

3. The method of claim 1, wherein access policies are enforced via read and write policy registers.

4. The method of claim 1, further comprising employing a single trusted entity to control access to access policy data.

5. The method of claim 1, wherein the memory interconnect comprises a memory fabric employing memory coherence.

6. The method of claim 1, wherein the IO interconnect comprises an IO fabric.

7. The method of claim 1, wherein the system comprises a system on a chip (SoC) including a memory fabric comprising the memory interconnect and an IO fabric comprising the IO interconnect.

8. The method of claim 1, further comprising enforcing the secure access mechanism by assigning an access role to each initiator device in the system, each role defining access privileges associated with the role, wherein the set of immutable security attributes provided with transactions initiated by a given initiator include information identifying the role associated with the initiator device.

9. The method of claim 1, wherein at least one of the memory interconnect and the IO interface component employs a first protocol and the system includes an interface component employing a second protocol, the method further comprising mapping immutable security attributes between the first and second protocols.

10. A system on a chip (SoC), comprising:
a first fabric comprising a memory fabric, including a memory interface to which memory may be operatively coupled;
one or more processing cores operatively coupled to the memory fabric;
a second fabric comprising an Input/Output (IO) fabric, operatively coupled to the memory fabric via an interface, the IO fabric including interfaces to a plurality of IO devices; and
a secure access mechanism under which resource access requests associated with transactions initiated by an initiator device to access a target resource in the SoC include a set of immutable security attributes defining access privileges associated with the initiator device that are evaluated against an access policy defined for the target resource to determine whether the transaction is permitted,
wherein the initiator devices include devices that can initiate transactions via the SoC including internal devices in the SoC and IO devices operatively coupled to an interface of the SoC, wherein target resources include memory and register resources included in the SoC, memory coupled to the memory fabric and IO fabric and memory and register resources accessible via the IO devices, and wherein all security attributes in each set of immutable security attributes are immutable.

11. The SoC of claim 10, further comprising read and write policy registers configured to store read and write permission data that is used to determine whether a transaction involving read or write access to a target resource is allowed based on the set of immutable security attributes associated with the transaction.

12. The SoC of claim 11, further comprising a control policy register configured to store data identifying a trusted entity that is allowed to configure the read and write policy registers.

13. The SoC of claim 10, further comprising hardware-based mechanisms to generate a set of immutable security attributes for each transaction initiated by an initiator device involving accessing a target resource via the SoC.

14. The SoC of claim 10, wherein the memory fabric and IO fabric employ a first protocol, the SoC further comprising,
a bus coupled to one of the memory fabric or IO fabric via a corresponding interface or bridge, the bus employing a second protocol; and
a mapping mechanism configured to map security attribute information between the first and second protocols.

15. The SoC of claim 10, wherein the security access mechanism employs a role-based access scheme under which access privileges are associated with corresponding roles and each initiator device is assigned an access role, and further wherein the access role associated with an initiator device may be identified by at least one immutable security attribute in the set of immutable security attributes associated with a transaction initiated by that device.

16. A computer system comprising:
a system on a chip (SoC), including,
a first fabric comprising a memory fabric, including a memory interface and a core interface and employing a first protocol;
one or more processing cores operatively coupled to the memory fabric via the core interface;
a second fabric comprising an Input/Output (IO) fabric, operatively coupled to the memory fabric via an interface; and
memory, operative coupled to the memory fabric via the memory interface; and
a plurality of IO devices, operatively coupled to the IO Fabric,
wherein the SoC further includes a secure access mechanism under which resource access requests associated with transactions initiated by an initiator device to access a target resource in the SoC include a set of immutable security attributes defining access privileges associated with the initiator device that are evaluated against an access policy defined for the target resource to determine whether the transaction is permitted,
wherein the initiator devices comprise devices that can initiate transactions via the SoC including devices in the SoC and IO devices interfaced to the IO fabric, wherein target resources include memory and register resources included in the SoC, memory coupled to the memory fabric and IO fabric and memory and register resources accessible via the IO devices, and wherein all security attributes in each set of immutable security attributes are immutable.

17. The computer system of claim 16, wherein the memory fabric and IO fabric employ a first protocol, the system further comprising:
a bus employing a second protocol, operatively coupled to the IO fabric via a bridge; and, a mapper in the bridge that maps immutable security attribute data between the first and second protocols.

18. The computer system of claim 16, further comprising hardware-based mechanisms to generate a set of immutable security attributes for each transaction initiated by an initiator device in the computer system.

19. The system of claim 16, further comprising one or more read and write policy registers configured to store data used to enforce access policies.

20. The system of claim 16, wherein sets of immutable security attributes are automatically generated by system hardware.

\* \* \* \* \*